United States Patent
Lin et al.

(10) Patent No.: US 11,928,247 B2
(45) Date of Patent: Mar. 12, 2024

(54) METHODS AND DEVICES FOR AI MODEL INTEGRITY AND SECRECY PROTECTION

(71) Applicant: Cvitek Co. Ltd., Beijing (CN)

(72) Inventors: Tsung-Hsien Lin, Zhubei (TW); Jen-Shi Wu, Zhubei (TW); Hsiao-Ming Chang, New Taipei (TW)

(73) Assignee: CVITEK CO. LTD., Beijing (CN)

(*) Notice: Subject to any disclaimer, the term of this patent is extended or adjusted under 35 U.S.C. 154(b) by 270 days.

(21) Appl. No.: 17/516,423

(22) Filed: Nov. 1, 2021

(65) Prior Publication Data
US 2022/0164481 A1 May 26, 2022

(30) Foreign Application Priority Data
Nov. 24, 2020 (CN) .......................... 202011329685.6

(51) Int. Cl.
*G06F 21/64* (2013.01)
*G06F 21/60* (2013.01)
*H04L 9/08* (2006.01)
*H04L 9/32* (2006.01)

(52) U.S. Cl.
CPC ............ *G06F 21/64* (2013.01); *G06F 21/602* (2013.01); *H04L 9/0825* (2013.01); *H04L 9/0863* (2013.01); *H04L 9/3236* (2013.01)

(58) Field of Classification Search
CPC ..... G06F 21/64; G06F 21/602; H04L 9/0825; H04L 9/0863; H04L 9/3236; H04L 9/14; H04L 9/3247
See application file for complete search history.

(56) References Cited

U.S. PATENT DOCUMENTS

| | | | | |
|---|---|---|---|---|
| 10,771,441 | B2* | 9/2020 | Neumann | H04L 9/3247 |
| 2010/0106973 | A1* | 4/2010 | Guenther | H04L 9/3231 |
| | | | | 713/176 |
| 2010/0180027 | A1* | 7/2010 | Drako | G06F 21/60 |
| | | | | 709/225 |
| 2011/0055585 | A1* | 3/2011 | Lee | H04L 9/3218 |
| | | | | 713/183 |
| 2018/0373859 | A1* | 12/2018 | Ganong | G06F 21/64 |
| 2019/0245696 | A1* | 8/2019 | Gulati | H04L 9/3263 |
| 2020/0184706 | A1* | 6/2020 | Speasl | H04L 9/0643 |
| 2020/0193028 | A1* | 6/2020 | Norem | G06F 21/572 |
| 2020/0250344 | A1* | 8/2020 | Rahn | H04L 9/3236 |
| 2023/0261882 | A1* | 8/2023 | Zhang | G06F 21/31 |
| | | | | 713/189 |

* cited by examiner

*Primary Examiner* — J. Brant Murphy
(74) *Attorney, Agent, or Firm* — Innovation Counsel LLP

(57) ABSTRACT

An encryption and signature device for AI model protection is provided. The encryption and signature device for AI model protection includes a key derivation unit, a model encryption unit, a model password encryption unit, an image generation unit and a signature unit. The key derivation unit is configured to derive a model key according to a model password and a derivation function. The model encryption unit is configured to encrypt an AI model according to the model key to generate an encrypted AI model. The model password encryption unit is configured to encrypt the model password to generate an encrypted model password. The image generation unit is configured to generate an image file according to the encrypted model password and the encrypted AI model. The signature unit is configured to sign the image file according to a private key to obtain a signed image file.

10 Claims, 3 Drawing Sheets

METHODS AND DEVICES FOR AI MODEL INTEGRITY AND SECRECY PROTECTION

This application claims the benefit of People's Republic of China application Serial No. 202011329685.6, filed Nov. 24, 2020, the subject matter of which is incorporated herein by reference.

BACKGROUND OF THE INVENTION

Field of the Invention

The invention relates in general to an encryption and signature method, an encryption and signature device, a decryption and verification method, a decryption and verification device, and more particularly to an encryption and signature method, an encryption and signature device, a decryption and verification method, and a decryption and verification device for AI model integrity and secrecy protection.

Description of the Related Art

In recent years, artificial intelligence (AI) technology has been rapidly developed and widely used in different fields to resolve various problems. However, current operation platform still cannot provide sufficient security protection to the AI model, making the AI model vulnerable to malicious attacks, which may cause severe loss to the supplier or property owner of the AI model.

Therefore, it has become a prominent task for the industries to provide a protection mechanism to the AI model to avoid the AI model being maliciously tampered and terminating the operation.

SUMMARY OF THE INVENTION

The invention is directed to an encryption and signature method, an encryption and signature device, a decryption and verification method, and a decryption and verification device for AI model integrity and secrecy protection.

According to one embodiment of the present invention, an encryption and signature device for AI model protection is provided. The encryption and signature device for AI model protection includes a key derivation unit, a model encryption unit, a model password encryption unit, an image generation unit and a signature unit. The key derivation unit is configured to derive a model key according to a model password and a derivation function. The model encryption unit is configured to encrypt an AI model according to the model key to generate an encrypted AI model. The model password encryption unit is configured to encrypt the model password to generate an encrypted model password. The image generation unit is configured to generate an image file according to the encrypted model password and the encrypted AI model. The signature unit is configured to sign the image file according to a private key to obtain a signed image file.

According to another embodiment of the present invention, an encryption and signature method for AI model protection is provided. The encryption and signature method for AI model protection includes the following steps: A model key is derived according to a model password and a derivation function. The AI model is encrypted according to the model key encryption to generate an encrypted AI model. The model password is encrypted to generate an encrypted model password. An image file is generated according to the encrypted model password and the encrypted AI model. The image file is signed according to a private key to obtain a signed image file.

According to an alternate embodiment of the present invention, a decryption and verification device for AI model protection is provided. The decryption and verification device for AI model protection includes a verification unit, an image reading unit, a model password decryption unit, a key derivation unit and a model decryption unit. The verification unit is configured to, in a trusted execution environment (TEE), verify a signed image file according to a public key. The image reading unit is configured to, in the trusted execution environment, obtain an encrypted model password and an encrypted AI model according to the image file. The model password decryption unit is configured to, in the trusted execution environment, decrypt the encrypted model password to obtain the model password. The key derivation unit is configured to, in the trusted execution environment, derive a model key according to the model password and a derivation function. The model decryption unit is configured to, in the trusted execution environment, decrypt the encrypted AI model to obtain the AI model according to the model key.

According to another alternate embodiment of the present invention, a decryption and verification method for AI model protection is provided. The decryption and verification method for AI model protection includes the following steps. In a trusted execution environment, a signed image file is verified according to a public key. In the trusted execution environment, an encrypted model password and an encrypted AI model are obtained according to the image file. In the trusted execution environment, the encrypted model password is decrypted to obtain a model password. In the trusted execution environment, a model key is derived according to the model password and a derivation function. In the trusted execution environment, decrypt the encrypted AI model to obtain the AI model according to the model key.

The above and other aspects of the invention will become better understood with regard to the following detailed description of the preferred but non-limiting embodiment (s). The following description is made with reference to the accompanying drawings.

DETAILED DESCRIPTION OF THE INVENTION

Detailed descriptions of the structural and operation principles of the present invention are disclosed below with accompanying drawings.

Figure 1:
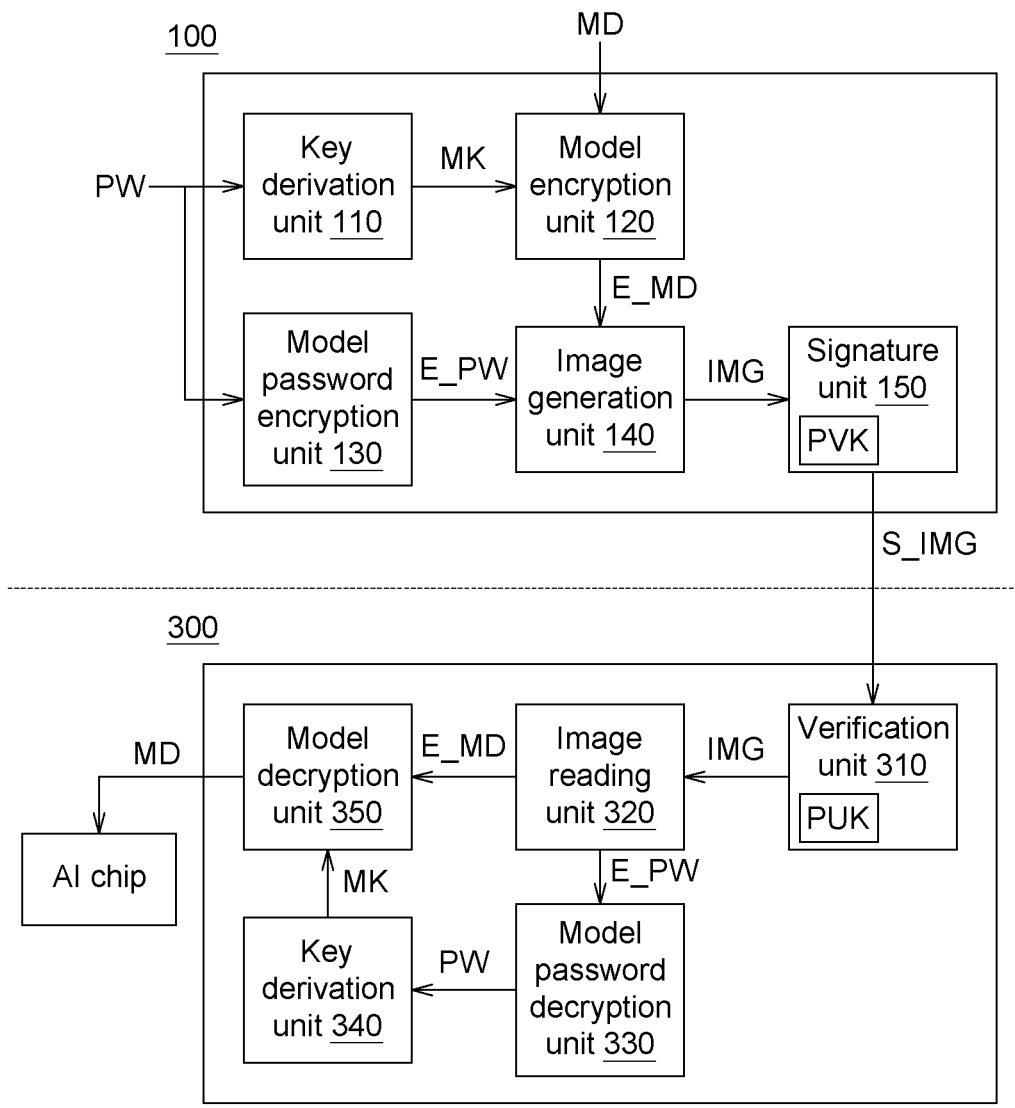
FIG. 1 is a schematic diagram of an encryption and signature device for AI model protection and a decryption and verification device for AI model protection according to an embodiment of the present invention.

Referring to FIG. 1, a schematic diagram of an encryption and signature device 100 for AI model protection and a decryption and verification device 300 for AI model protection according to an embodiment of the present invention is shown. The encryption and signature device 100 includes a key derivation unit 110, a model encryption unit 120, a model password encryption unit 130, an image generation unit 140 and a signature unit 150. The key derivation unit 110, the model encryption unit 120, the model password encryption unit 130, the image generation unit 140 and the signature unit 150 can be a chip, a circuit board or a circuit. The decryption and verification device 300 includes a verification unit 310, an image reading unit 320, a model password decryption unit 330, a key derivation unit 340 and a model decryption unit 350. The verification unit 310, the image reading unit 320, the model password decryption unit 330, the key derivation unit 340 and the model decryption unit 350 can be a chip, a circuit board or a circuit.

Figure 2:
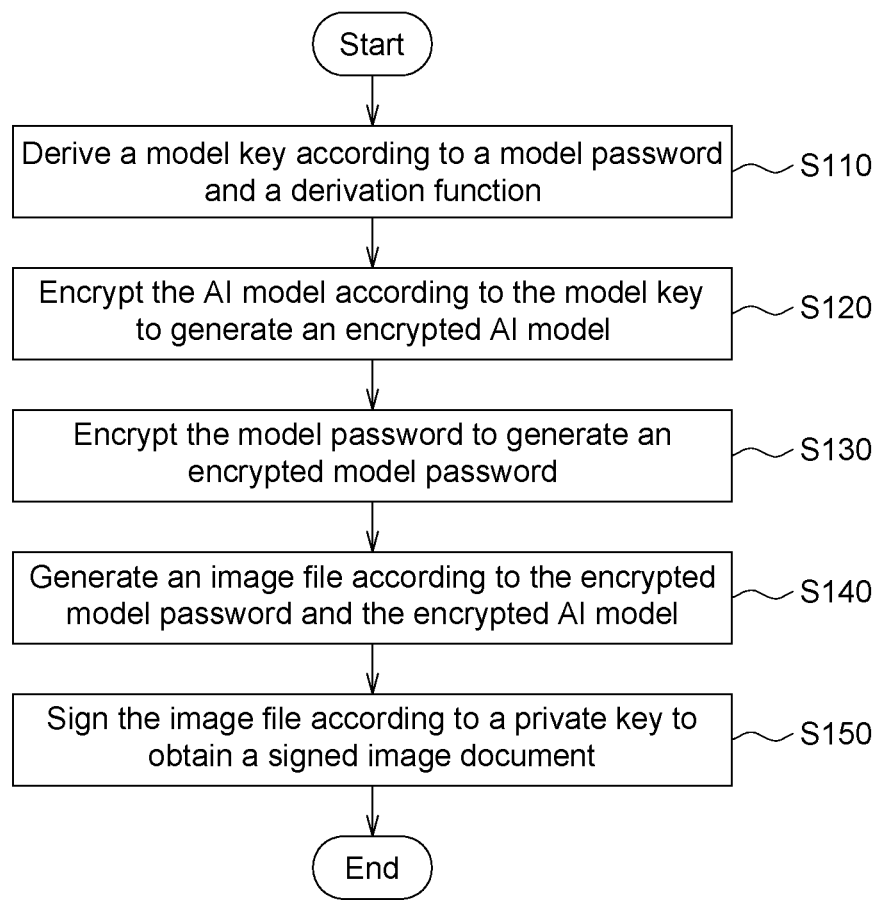
FIG. 2 is a flowchart of an encryption and signature method for AI model protection according to an embodiment of the present invention.

Referring to both FIGS. 1 and 2, FIG. 2 is a flowchart of an encryption and signature method for AI model protection according to an embodiment of the present invention. The encryption and signature method for AI model protection includes steps S110 to S150.

In step S110, a model key MK is derived by the key derivation unit 110 according to a model password PW and a derivation function. The model password PW is provided by the supplier or property owner of an AI model MD. The derivation function is provided by the supplier or property owner of the AI model MD or the AI chip supplier, and is bound with the encryption and signature device 100. The model password PW is composed of letters, numbers or text. The derivation function is a symmetric encryption algorithm (such as AES/SM4), a key derivation function (KDF), an asymmetric encryption algorithm (such as RSA/ECC), a public key signature algorithm (such as PKCS/DSA) or a secure hash algorithm (SHA), but the present invention is not limited thereto.

In step S120, the AI model MD is encrypted by the model encryption unit 120 according to the model key MK to generate an encrypted AI model E_MD. For example, the model encryption unit 120 encrypts the AI model MD using the AES algorithm, the DES algorithm or the SM4 algorithm according to the model key MK to generate the encrypted AI model E_MD.

In step S130, the model password PW is encrypted by the model password encryption unit 130 to generate an encrypted model password E_PW. For example, the model password encryption unit 130 encrypts the model password PW using the AES algorithm, the DES algorithm or the SM4 algorithm to generate an encrypted model password E_PW, but the present invention is not limited thereto. The model password encryption unit 130 can encrypt the model password PW using any encryption algorithm.

In step S140, an image file IMG is generated by the image generation unit 140 according to the encrypted model password E_PW and the encrypted AI model E_MD.

In step S150, the image file IMG is signed by the signature unit 150 according to a private key PVK to obtain a signed image file S_IMG. The private key PVK is provided by the supplier or property owner of the AI model MD. For example, the signature unit 150 signs the image file IMG using an asymmetric encryption algorithm (such as the RSA/ECC) or a public key signature algorithm (such as the DSA) to obtain a signed image file S_IMG, but the present invention is not limited thereto, and the signature unit 150 can sign the image file IMG using any encryption algorithm.

According to the encryption and signature device 100 and method for AI model protection of the present invention, the derivation function for deriving the model key MK is provided by the supplier or property owner of the AI model MD, the AI chip supplier is bound with the encryption and signature device 100, and the model password PW is provided by the supplier or property owner of the AI model MD. Therefore, no one but the supplier or property owner of the AI model MD can access the model key MK to encrypt the AI model MD, and the security of the AI model MD can be enhanced.

Figure 3:
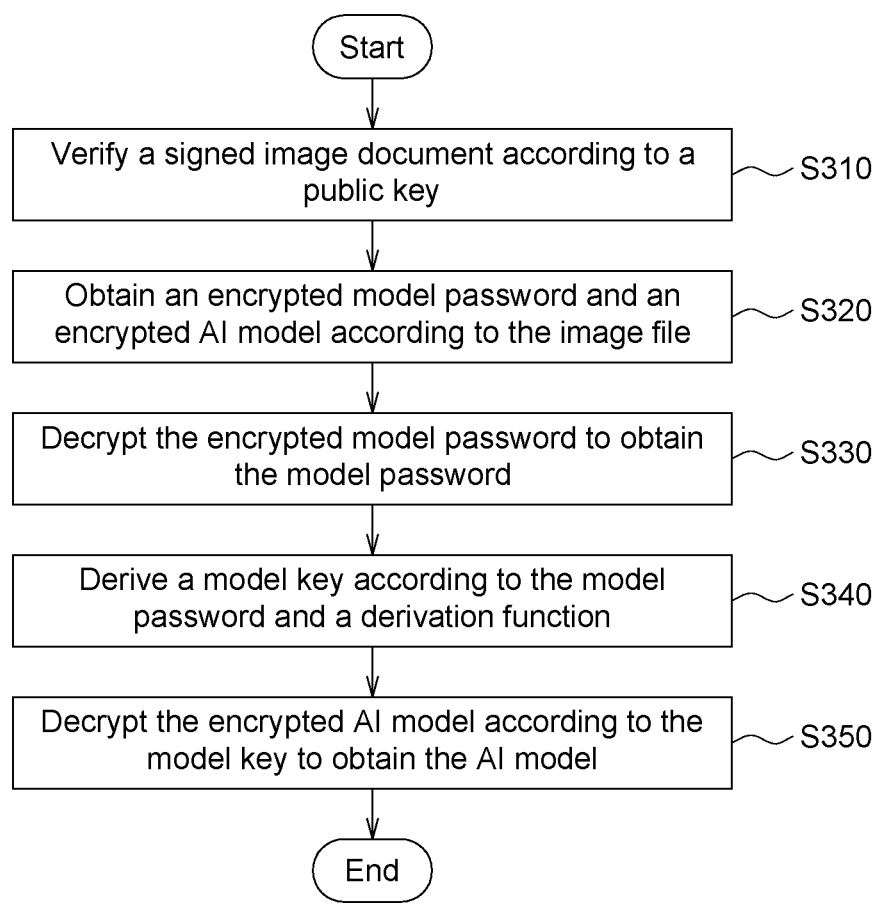
FIG. 3 is a flowchart of a decryption and verification method for AI model protection according to an embodiment of the present invention.

Referring to both FIGS. 1 and 3, FIG. 3 is a flowchart of a decryption and verification method for AI model protection according to an embodiment of the present invention. The decryption and verification method for AI model protection includes steps S310 to S350, which are performed in a trusted execution environment. Ordinary applications or operating systems cannot access data in the trusted execution environment, which is independent of ordinary operating environment. The trusted execution environment can be an environment with independent central processing unit (CPU) and dynamic random access memory (DRAM), an environment where the CPU has a security mode and the DRAM has security blocks, or an environment with security chip, and the present invention is not limited to the above exemplifications.

In step S310, a signed image file S_IMG is verified by the verification unit 310 according to a public key PUK. The public key PUK is provided by the supplier or property owner of an AI model MD and corresponds to the private key PVK.

In step S320, an encrypted model password E_PW and an encrypted AI model E_MD are obtained by the image reading unit 320 according to the image file IMG.

In step S330, the encrypted model password E_PW is decrypted by the model password decryption unit 330 to obtain the model password PW. For example, the model password decryption unit 330 decrypts the encrypted model password E_PW using the AES algorithm, the DES algorithm or the SM4 algorithm to obtain the model password PW, but the present invention is not limited thereto.

In step S340, the model key MK is derived by the key derivation unit 340 according to the model password PW and a derivation function. The derivation function is provided by the AI model supplier or property owner of the AI model MD and the chip supplier and is bound with the decryption and verification device 100. The function can be a symmetric encryption algorithm (such as AES/SM4), a key derivation function (KDF), an asymmetric encryption algorithm (such as RSA/ECC), a public key signature algorithm (such as PKCS/DSA) or a secure hash algorithm (SHA), but the present invention is not limited thereto.

In step S350, the encrypted AI model E_MD is decrypted by the model decryption unit 350 according to the model key MK to obtain the AI model MD. For example, the model decryption unit 350 decrypts the encrypted AI model E_MD according to the model key MK using the AES algorithm, the DES algorithm or the SM4 algorithm to obtain the AI model MD. Then, in a trusted execution environment, the AI model MD is operated via an AI chip to provide services.

Thus, according to the decryption and verification device 300 and method for AI model protection of the present invention, the supplier or property owner of the AI model MD does not transmit the model key MK to the decryption and verification device 300. Instead, the derivation function for deriving the model key MK is provided by the supplier or property owner of the AI model MD and the AI chip supplier and is bound with the decryption and verification device 300. Therefore, no one but the supplier or property owner of the AI model MD can access the model key MK to encrypt the AI model MD, and the security of the AI model MD can be increased. Besides, the decryption and verification device 300 and the AI model MD both are performed in a trusted execution environment, therefore the security of the AI model MD can be enhanced.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An encryption and signature device for AI model protection, comprising:
   a key derivation unit configured to derive a model key according to a model password and a derivation function;
   a model encryption unit configured to encrypt an AI model according to the model key to generate an encrypted AI model;
   a model password encryption unit configured to encrypt the model password to generate an encrypted model password;
   an image generation unit configured to generate an image file according to the encrypted model password and the encrypted AI model; and
   a signature unit configured to sign the image file according to a private key to obtain a signed image file.

2. The encryption and signature device according to claim 1, wherein the model password and the private key are provided by a supplier or property owner of the AI model, and the derivation function is a symmetric encryption algorithm, a key derivation function, an asymmetric encryption algorithm, a public key signature algorithm or a secure hash algorithm.

3. The encryption and signature device according to claim 1, wherein the derivation function is bound with the encryption and signature device.

4. An encryption and signature method for AI model protection, comprising:
   deriving a model key according to a model password and a derivation function;
   encrypting an AI model according to the model key to generate an encrypted AI model;
   encrypting the model password to generate an encrypted model password;
   generating an image file according to the encrypted model password and the encrypted AI model; and
   signing the image file according to a private key to obtain a signed image file.

5. The encryption and signature method according to claim 4, wherein the model password and the private key are provided by a supplier or property owner of the AI model; and the derivation function is a symmetric encryption algorithm, a key derivation function, an asymmetric encryption algorithm, a public key signature algorithm or a secure hash algorithm.

6. A decryption and verification device for AI model protection, comprising:
   a verification unit configured to, in a trusted execution environment, verify a signed image file according to a public key;
   an image reading unit configured to, in the trusted execution environment, obtain an encrypted model password and an encrypted AI model according to the image file;
   a model password decryption unit configured to, in the trusted execution environment, decrypt the encrypted model password to obtain a model password;
   a key derivation unit configured to, in the trusted execution environment, derive a model key according to the model password and a derivation function; and
   a model decryption unit configured to, in the trusted execution environment, decrypt the encrypted AI model according to the model key to obtain the AI model.

7. The decryption and verification device according to claim 6, wherein the model password and the public key are provided by a supplier or property owner of the AI model; and the derivation function is a symmetric encryption algorithm, a key derivation function, an asymmetric encryption algorithm, a public key signature algorithm or a secure hash algorithm.

8. The decryption and verification device according to claim 6, wherein the derivation function is bound with the decryption and verification device.

9. A decryption and verification method for AI model protection, comprising:
   in a trusted execution environment, verifying a signed image file according to a public key;
   in the trusted execution environment, obtaining an encrypted model password and an encrypted AI model according to the image file;
   in the trusted execution environment, decrypting the encrypted model password to obtain a model password;
   in the trusted execution environment, deriving a model key according to the model password and a derivation function; and
   in the trusted execution environment, decrypting the encrypted AI model according to the model key to obtain an AI model.

10. The decryption and verification method according to claim 9, wherein the model password and the public key are provided by a supplier or property owner of the AI model; and the derivation function is a symmetric encryption algorithm, a key derivation function, an asymmetric encryption algorithm, a public key signature algorithm or a secure hash algorithm.

* * * * *